Feb. 22, 1966  J. E. L. ALLETRU  3,236,966
RESETTABLE ACTUATOR
Filed July 10, 1962

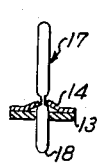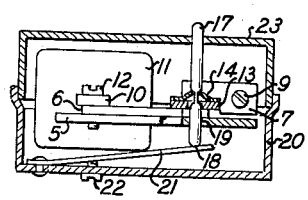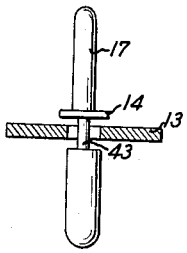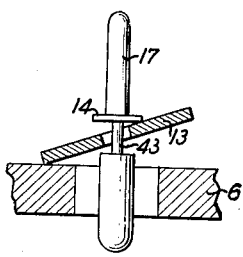
Fig. 15    Fig. 16    Fig. 17    Fig. 18
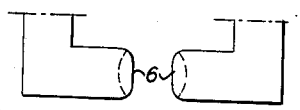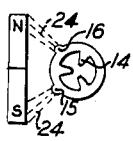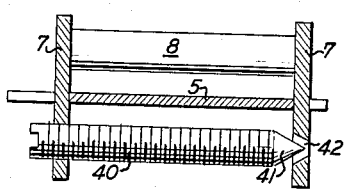
Fig. 19    Fig. 20    Fig. 23
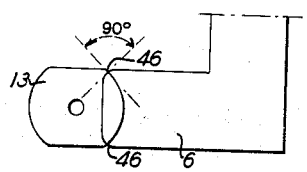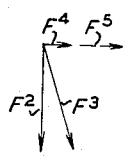
Fig. 24    Fig. 25    Fig. 31
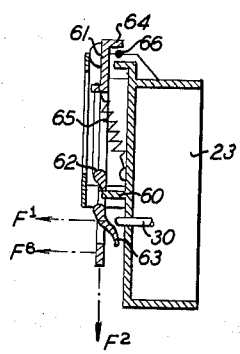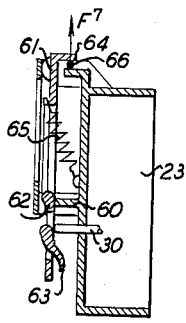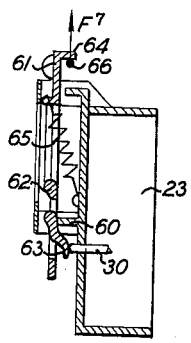
Fig. 28    Fig. 29    Fig. 30

Feb. 22, 1966  J. E. L. ALLETRU  3,236,966
RESETTABLE ACTUATOR
Filed July 10, 1962
3 Sheets-Sheet 3
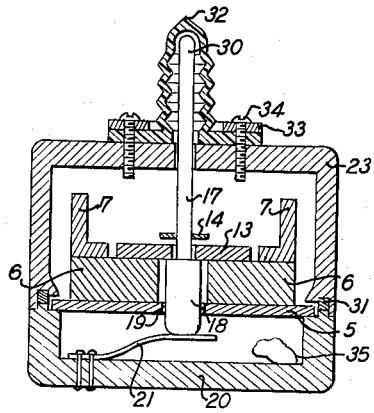
Fig-21
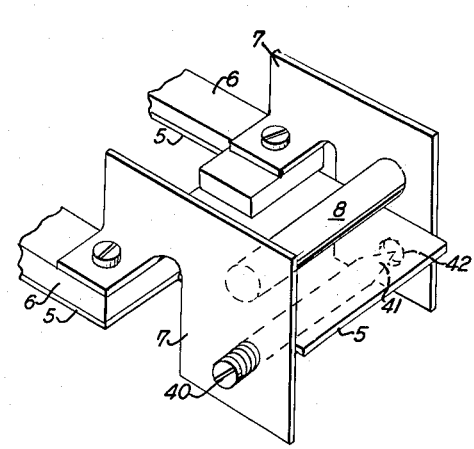
Fig-22
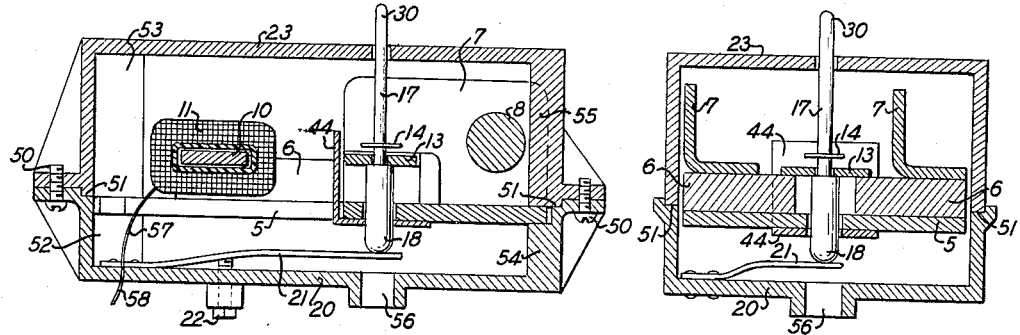
Fig-26
Fig-27

United States Patent Office 3,236,966
Patented Feb. 22, 1966

3,236,966
RESETTABLE ACTUATOR
Jean Edmond Louis Alletru, Maintenon, France, assignor to Société à Responsabilité Limitée Etablissements Bresson-Faille-Marchand, Paris, France, a corporation of France
Filed July 10, 1962, Ser. No. 208,852
Claims priority, application France, July 10, 1961, 867,472, Patent 80,080; Jan. 8, 1962, 884,156, Patent 1,318,681; Feb. 28, 1962, 889,441, Patent 81,233; May 24, 1962, 898,670, Patent 81,730; June 6, 1962, 899,889, Patent 81,893
11 Claims. (Cl. 200—95)

The invention relates to an ultra-sensitive resettable electromagnetic actuator, that is to say, after the actuator has operated by releasing its magnetic blade, it is necessary to re-close it externally in order to reset it to the working position.

Ultra-sensitive resettable actuators are known, in particular from French Patent No. 1,268,367 of the present applicants, which describes the principal and two embodiments of such a relay. Operation of the actuator is based on the sub-division of the magnetic flux of a permanent magnet into two magnetic circuits, one magnetic circuit comprising the moving blade and the other including the core of an operating solenoid, with adjustment by means of an adjustable air-gap arranged in series with the flux of the permanent magnet and which utilizes the saturation in the moving blade.

The present invention relates to an ultra-sensitive resettable actuator of totally different construction, which does not use saturation, and when so required, utilizing a different adjustment, namely a third magnetic circuit with an adjustable air-gap, mounted in parallel with the two other magnetic circuits.

The relay according to the invention has for its object a simple and economical construction, in particular by the utilization of glued assemblies.

The actuator according to the invention has also for another object a miniature construction, that is to say one having an extremely small overall size, with the particular object of incorporating the actuator in an apparatus, for example a domestic switch, which is itself of a miniature type.

The actuator according to the invention has also for a further object an actuator with a particularly light movng system which is thus insensitive to shocks and vibrations and which absorbs or supplies very small mechanical forces. To this end, the invention expressly provides for the limitation of the mechanical force necessary for reclosure (resetting of the actuator) to a very low value. For this purpose, contrary to conventional constructions, the mechanical force liberated by the electric impulse at the opening of the actuator has been deliberately limited, for example to a value of about 15 grams, to which there corresponds a value of 20 grams, approximately of the force of reclosure. In other words forces are employed which are about five times smaller than those usually allowed for.

Finally, the actuator according to one embodiment of the invention is preferably of dust-proof construction.

The various embodiments of an actuator according to the invention will now be described with reference to FIGS. 1 to 31 of the accompanying drawings given by way of examples and not in any limiting sense. In these drawings:

FIG. 1 explains the operation of the actuator, the magnetic circuit diagram of which is shown in FIG. 2.

FIGS. 3 to 11 represent the stages of a construction of the actuator according to the invention, of which the whole unit is shown in cross-section in FIG. 16, FIGS. 12 to 20 being explanatory details.

FIG. 21 shows to a larger scale, the arrangements for making one embodiment of the actuator absolutely dust-tight.

FIGS. 22 and 23 show the adjustment of the actuator by an auxiliary magnetic circuit.

FIGS. 24 and 25 show an improvement in the bearing of the blade of the relay.

FIGS. 26 and 27 show to a larger scale another embodiment of the actuator according to the invention.

FIGS. 28 to 31 show the operation of a secondary lock through which the ultra-sensitive actuator operates the utilization apparatus.

Figure 1:
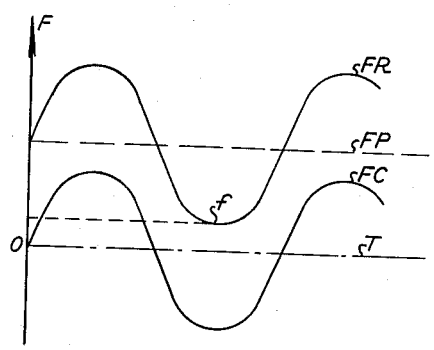

The actuator according to the invention can operate without employing the phenomena of magnetic saturation referred to in the above-mentioned French patent. More precisely, the magnetic release of the blade comprising the moving system is obtained by the opposition of flux applied by the permanent magnet and the demagnetizing flux created by an alternating control current in the control coil of the actuator during one-half period. FIG. 1 is the diagram of this operation, representing the magnetic fluxes as a function of time. The flux produced by the permanent magnet is represented by the straight line FP, the flux produced by the operating current in the control coil is represented by the sine-wave FC, and the resultant flux is represented by the sine-wave FR. At the moment when the resultant flux passes through a minimum $f$, the magnetic holding force on the blade becomes less than the opposing force applied by a spring and the actuator therefore releases. Thus as long as there is not alternating current applied to the control coil the flux of the permanent magnet creates sufficient magnetic force to overcome the opposing spring force. However, when the alternating flux generated by the control current cancels a portion of the permanent magnet flux the spring force takes over.

Figure 2:
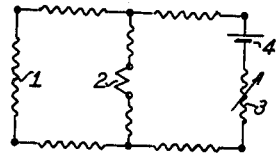

FIG. 2 shows the electrical analogy of the magnetic circuit wherein the reluctances are shown as resistors and the flux sources as generators; the reluctance of the coil support for the control coil is shown at 1, that of the moving blade at 2, the adjustable reluctance of the air-gap of the magnet at 3, and the magnetomotive force of the magnet at 4.

Figure 3:
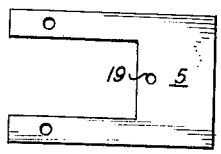
Figure 4:
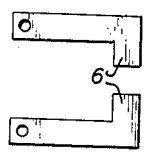
Figure 5:
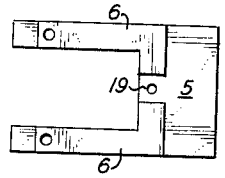
Figure 6:
Figure 6:
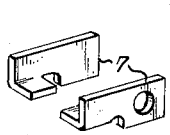
Figure 7:
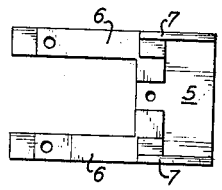
Figure 9:
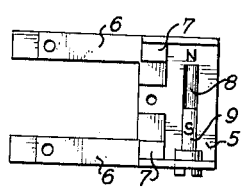
Figure 10:
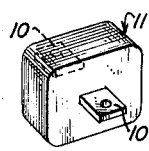

One embodiment of the actuator according to the invention will now be described with reference to FIGS. 3 to 17. On a slotted plate 5 made from a non-magnetic material (FIG. 3) and serving as a support for the whole unit, two L-shaped pieces 6 (FIG. 4) are glued by means of a synthetic resin. Pieces 6 are cut-out from ferromagnetic metal having uniform properties. Each L-shaped piece 6 includes an upright portion and a base portion. The upright portions are parallel to each other and disposed on opposite sides of the slot of plate 5. The base portions are colinear and extend toward each other. The ends of the base portions act as magnetic pole shoes. There is thus obtained the partial assembly shown in FIG. 5. The upper surface of the pieces 6 is then machined so as to obtain an appropriate surface condition. The ferromagnetic supports 7 of the magnet (FIG. 6) are glued by means of the resin above-mentioned so as to obtain the assembly shown in FIG. 7. A permanent magnet 8 cylindrical or otherwise, glued to the extremity of a ferromagnetic screw 9 (FIG. 8) is then mounted on the circuit (FIG. 9). The ferromagnetic rod 10 carrying the operating coil 11 (FIG. 10) and made from the same material as the pieces 6, is fixed by means of two screws 12 on the relay (FIG. 11).

Figures 12, 13, 14:
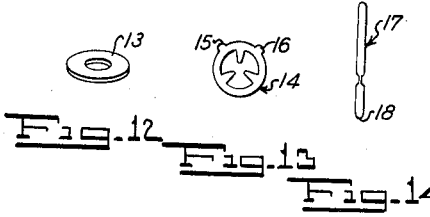

The moving system includes a stamped blade 13 of ferromagnetic material (a platelike armature) having one face machined (FIG. 12) and a washer 14 (FIG. 13)

made from very thin ferromagnetic material and acting as a spring. Washer 14 is provided with two small tongues 15 and 16 and is glued on the unmachined face of the blade 13. A shaft 17 (FIG. 14) is then engaged in the washer-blade unit 13–14 resulting in the assembly shown in FIG. 15.

Figure 11:
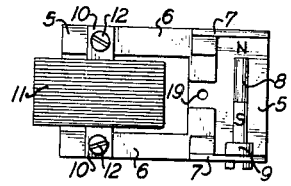

The extremity 18 of the shaft 17 is engaged in the hole 19 of the plate 5 (FIG. 11). The plate 5 is then mounted in a half-casing 20 (FIG. 16), of insulating material or not, but non-magnetic casing 20 carries a non-magnetic leaf spring 21, adjustable by screw 22 acting on extremity 18. The unit is then completed by an upper half-casing 23 of the same kind as the lower half-casing 20, rendering the unit dust-tight. The shaft 17 of the moving system, slides in upper half-casing 23 and accordingly has two bearings.

The applicant has observed that a more constant accuracy of the device is obtained by always positioning the blade 13 in its magnetic circuit in the same way. More precisely, it is necessary for the satisfactory seating of the blade 13 on the two L-shaped pieces 6, to give it a certain freedom of movement on its shaft 17. The freedom of movement is easily effected (FIG. 17) by giving the blade 13 (and its washer 14) a certain amount of play in the groove 43 which holds them on the shaft 17. However, when the blade 13 closes on to the L-shaped pieces 6, experience has shown that by reason of the action of magnetic attraction, there is always a first point of contact (FIG. 18) on the lower periphery of the blade 13 before the flat seating on the L-shaped pieces 6 is effected. This point of contact changes for each closure. At the end of a certain number of closures, the edge of the blade 13 makes a pronounced mark on the pieces 6 (FIG. 19) and vice-versa. Such scoring of material on the air-gap surfaces rendering the operation of the relay irregular. In order to overcome this drawback, the blade 13 is guided into position by the washer 14, which is glued on the blade, and the two tongues 15 and 16 thereon utilizing the magnetic leakage 24 of the magnet 8–9 (FIG. 20) in such manner that the blade 3 is always aligned in the same angular position.

It has been stated above that an embodiment of the actuator are housed in a dust-tight casing made in two halves 20 and 23 (FIG. 21). It is clear that there is an advantage in covering the relay in as fluid-tight a manner as possible, so as to prevent the introduction of foreign bodies however small (dust, moisture, oxidizing gases) into the working air-gaps, i.e., between the blade 13 and the pieces 6. Furthermore, it is essential that the shaft 17 which transmits the mechanical action of the blade 13 by its extremity 30 to the release system of the apparatus, passes through the casing 23, which furthermore serves as a bearing for the shaft for reasons of economy in construction.

These objects are achieved by employing, in accordance another embodiment of the invention (FIG. 21):

A sealing joint 31 mounted between the two half-casings 20 and 23; and

A flexible hollow finger 32, bellows-shaped or otherwise, which can be fixed in known manner by screw 34 and plate 33, glueing, etc., on the casing 23 so as to enclose shaft 17 without hindering its movements.

The finger 32 furthermore enables all variations of pressure in the interior of the casing to be absorbed.

A desiccator bag 35 is mounted inside the casing in order to absorb all moisture.

According to the invention, an improvement in the ultra-sensitive actuator consists in providing the permanent magnet of the relay with a device for regulating the magnetic flux of the magnet by shunting the magnetic flux. The device either co-operates with the adjustable air-gap of the magnet, or replacing the air-gap.

This improvement will be described with reference to FIG. 22, which is perspective view, and FIG. 23 which is a transverse section. The magnet 8 is mounted without an air-gap, for example, by glueing between the two supports 7, and an adjustable amount of the flux of the magnet 8 is shunted by a screw 40 of ferromagnetic material, screwed into one of the supports 7. The point 41 of the screw 40, which is preferably conical, approaches more or less closely a hole 42, preferably conical, formed directly opposite point 41 in the other support 7.

It is clear that the above regulation can be employed alone or in co-operation with the series adjustment on the above-mentioned patent, depending on questions of choice or opportunity.

A further improvement according to the invention relates to the mounting of the ferromagnetic blade 13 on its shaft 17. It has been explained above with reference to FIGS. 17 to 19, that the ferromagnetic blade 13 must always be positioned in the same manner with respect to its magnetic circuit. To this end, on the one hand the invention adds to the blade 13 a guide for its rotation, for example constituted by a lateral non-magnetic guide 44 shown in FIG. 24. Guide 44 co-operates, with a certain play, with one of the two edges 45 formed on the blade 13. On the other hand, the invention provides four rounded portions 46 on the pieces 6, as shown in FIG. 25, these rounded portions 46 being preferably so disposed that they are intersected at right angles by the periphery of the blade 13. It is clear that these rounded portions 46 of the pieces 6 shown in FIG. 25 may also be provided in the construction of the actuator previously described in connection with FIGS. 3 to 16 and 20. It is also clear that in this case, the washer 14 is not necessarily of magnetic material.

A construction of the actuator according to another embodiment of the invention will now be described with reference to FIG. 26, which is a central longitudinal section, and FIG. 27 which is a transverse section taken through the blade. The assembly formed by the plate 5 (of non-magnetic material), of the two magnetic L-shaped pieces 6 glued on the plate 5, the two magnetic supports 7 of the magnet 8 and the rod 10 of the coil 11 is housed between the upper half-casing 23 and the lower half-casing 20, preferably of insulating material. The half casings are assembled together by two countersunk screws 50 inset at 51, clamping the plate 5 at three points, on the one hand at two corners between two pillars 52 and back-pillars 53, and on the other hand between a central pillar 54 and its back pillar 55. The leaf spring 21 is adjustable from the exterior by its screw 22. An orifice 56 opposite the shaft 17 enables the relay to be mechanically tripped from the exterior. The wires 57 of the coil 11 pass through the lower half-casing 20 and are soldered on terminals 58.

The ultra-sensitive actuator according to a further embodiment of the invention is provided with a secondary actuator, which is released by the shaft of the first actuator and actuates the control system of the utilization apparatus.

This secondary actuator will be described with reference to FIG. 28 (which shows the actuator in the cocked position), FIG. 29 (which shows the actuator in the fired position), and FIG. 30 (which shows the actuator in the recocking position).

The ultra-sensitive actuator is contained in a half-casing 23 which is provided at its upper portion, of moulded construction, with all the arrangements permitting the operation described below, and in particular the latching boss 60. Shaft or striker 30 of the ultra-sensitive actuator acts in the direction of the arrow $F^1$; 61 is a striker which acts in the direction of the arrow $F^2$ on the main release lock of the utilizing apparatus (not shown). This striker 61 is made of moulded material filled with a self-lubricating agent in order to improve the friction on the latching which takes place between the above-mentioned boss 60 and a boss 62 forming part of the striker 61. Striker 61 is further provided with a flexible moulded blade 63 serving for the re-setting of the actuator and a one-piece arm 64 utilized for setting the striker 61 itself. 65 is a tension spring for storing energy; the spring 65 applies a force $F^3$, which is composed of the force $F^2$ (FIG. 31) on the latching system 62–60, and the force $F^4$ for retention of the latching. The self-lubricating agent has a very considerable effect, since the release of the striker 61 makes it necessary to overcome:

(1) The force $F^4$ which is essential for retention of latching and resistance to shocks;

(2) The force $F^5$ which is added to the force $F^4$ and results from the conversion of the force $F^2$ necessitated by the main lock, to a frictional force.

It should be noted that a bi-metallic strip or other release device acting in the direction of the arrow $F^6$ could replace striker 30.

A piano-wire spring 66 shown in section serves for re-setting the striker 61. This spring 66 exerts a force in the direction of the arrow $F^7$ (FIGS. 29 and 30) when under tension.

The operation of the secondary actuator will be described starting from the cocked position (FIG. 28).

The order for its release is given either: by the striker 30 of ultra-sensitive relay, in the direction of the arrow $F^1$; by a bi-metallic strip or other release device (not shown), exerting a force in the direction of the arrow $F^6$. The actuator fires.

The unlatching takes place between 62 and 60.

The striker 61 acts on the release device of the utilization apparatus in the direction of the arrow $F^2$.

The apparatus is then in the fired position shown in FIG. 29.

It should be noted that at this moment there exists only a slight play between the re-setting spring 66 and the arm 64 of the striker.

The utilization apparatus is released, the spring 66 pushes the arm 64 in the direction of the arrow $F^7$ and thus the striker moves upwards to the recocking position (FIG. 30). During this movement, its blade 63 eventually re-closes the first actuator by acting on striker 30 (with a force greater than and opposite to the force $F^1$). During the re-closure of the utilization apparatus, the striker is restored to its cocked position, as shown in FIG. 28.

It will be observed that the secondary actuator, which has the function of acting on the release of the utilization apparatus under the action of the ultra-sensitive actuator (or by the action of another release mechanism), is an energy-accumulation system which furthermore makes it possible to obtain:

In the event of tripping, simple re-setting of the ultra-sensitive actuator in a very short time;

A device preventing the deformation of the bi-metallic strip on a short-circuit if such strip is used as the release device;

A more uniform and regular thermal release.

This unit only utilizes three pieces:

The moulded upper portion of the insulating casing of the ultra-sensitive actuator (dust-tight casing);

The striker comprising mainly the latching system made of so-called plastic material of the nylon or Rilsan type, charged with a self-lubricating agent (molybdenum bisulphide); and A tension spring.

It should be noted that the mechanical latching is obtained by parts of moulded plastic material, of which at least one comprises a self-lubricating agent with the object of reducing the forces to a minimum.

What I claim is:

1. An actuator which is tripped by an alternating current signal and mechanically reset, comprising a movable element of ferromagnetic material, a spring means for exerting a force on said movable element to move in a first direction, magnetic pole shoes opposite said movable element, a permanent magnet, first ferromagnetic circuit means for magnetic circuit-wise connecting said permanent magnet to said magnetic pole shoes so that the magnetic flux of said permanent magnet passes through said magnetic pole shoes and a portion of said movable element to exert a force of said movable element which is greater than and opposite to the force exerted by said spring means, means adapted to receive an alternating current signal for generating an alternating magnetic flux, second ferromagnetic circuit means for magnetic circuit-wise connecting said means for generating an alternating magnetic flux to said magnetic pole shoes so that when said means for generating an alternating flux operates the generated magnetic flux during a portion of a cycle of alternation opposes a portion of the magnetic flux of said permanent magnet in said magnetic pole shoes to the extent that the force exerted on said movable element by the total magnetic flux in said magnetic pole shoes is less than the force exerted by said spring means whereby said movable element moves in said first direction to trip the actuator, means connected to said movable element moving said movable element in a direction opposite said first direction to reset the actuator, means for supporting said permanent magnet, said first and second ferromagnetic circuit means, and said controllable source, and means for controlling the magnetic flux of said permanent magnet in said first ferromagnetic circuit means.

2. An actuator comprising a plate of nonmagnetic material, said plate being provided with a slot, first and second flat L-shaped members including upright and base portions of ferromagnetic material affixed to said plate with said upright portions of the L-shaped members being parallel to each other and on opposite sides of the slot of said plate and said base portions of the L-shaped members being in spaced colinear relationship, a bar of ferromagnetic material affixed to said upright portions, a winding adapted to receive an alternating electrical current wound around said bar, a pair of angled support means of ferromagnetic material affixed to said plate and contacting regions of said base portions of said L-shaped members, a permanent magnet, means for connecting said permanent magnet to at least one of said support means in such manner that said permanent magnet is disposed between said support means, a bearing in said plate in the region between said base portions of said L-shaped members, a shaft of non-magnetic material passing through said bearing, a platelike armature of ferromagnetic material movably connected to said shaft and disposed substantially parallel to the plane of said plate, said shaft being movable in said bearing so that when said armature is drawn against the base portions of said L-shaped members under the influence of magnetic flux in said base portions from said permanent magnet said shaft is in a first position, and spring means in contact with said shaft exerting a force for urging said shaft from said first position to a second position, said winding, when receiving an alternating electrical circuit, generating an alternating magnetic flux which is superimposed in said base portions on the magnetic flux of said permanent magnet so that during a portion of a cycle of alternation of the alternating magnetic flux the force exerted by the total magnetic flux in said base portions on said platelike armature is less than the force exerted by said spring means whereby said shaft moves to said second position and said platelike armature is no longer influenced by the total magnetic flux in said base portions.

3. The actuator of claim 2 wherein said permanent magnet connecting means includes a threaded opening in one of said support means, a screw in said opening and said permanent magnet being affixed to said screw so that by rotating said screw the air-gap between the end of said permanent magnet remote from said screw and the other support means can be varied.

4. The actuator according to claim 1 wherein said shaft is provided with a peripheral groove and said armature is provided with an aperture, the aperture of said armature cooperating with the peripheral groove of said shaft so that said armature is supported freely rotatable about the axis of said shaft and limitly movable along the axis of said shaft and further comprising means for orienting said armature in rotation so that the same portions of said armature always contact said L-shaped members.

5. The actuator according to claim 2 wherein said armature is mounted in a peripheral groove in said shaft and is movable in said groove, said armature further including tab means for cooperating directly with the leakage flux of said permanent magnet to rotationally position said armature about said shaft.

6. The actuator of claim 2 wherein said armature is provided with an aperture, said shaft extending through said aperture so that said shaft is freely rotatable about the axis of said shaft, washer means fixed to said shaft for limiting movement of said armature along the axis of said shaft, and means for orienting the rotation of said armature as the latter approaches said L-shaped members so that substantially the same portions of said armature contact said L-shaped members for each actuation.

7. The actuator of claim 2 further comprising a housing, said housing being provided with an opening through which one end of said shaft passes, a striker slidably mounted on said housing, a spring connecting said striker to said housing and disposed under tension to exert a force perpendicular to the surface of said housing and a force in a given direction parallel to the surface of said housing, a first boss on said housing and a second boss on said striker, said bosses being disposed with respect to each other to prevent motion of said striker in said given direction by the mutual abutment of said bosses, the end of said shaft being opposite said striker so that when said relay is energized said shaft urges said striker outward from said housing whereby said second boss overrides said first boss and the force of said spring drives said striker in said given direction.

8. The actuator of claim 7 further including on said striker a flexible ramplike element operatively disposed with respect to said end of said shaft so that when said striker is moved from its rest position in a direction opposite said given direction said ramplike element rides over the end of said shaft and the latter is urged inward of said housing to reset said actuator by bringing said armature in contact with said base portions of said L-shaped members.

9. The actuator of claim 8 further comprising other spring means operable after said striker has moved in said given direction to drive said striker back in a direction opposite said given direction.

10. In combination with a resettable actuator having a shaft having an axis, said shaft being movable between a retracted and an extended position wherein in the unactuated state said shaft is in said retracted position and in the actuated state said shaft is in said extended position and wherein said resettable actuator is triggered to an actuated state by a signal and reset to the unactuated state by moving said shaft to the retracted position, a secondary actuator comprising a striker, means for slidably mounting said striker opposite an end of said shaft whereby said striker can move in either direction along a line perpendicular to the axis of said shaft, spring means connected to said striker and said resettable actuator for exerting under tension forces parallel to said shaft and in one direction along said line, a first boss on said actuator and a second boss on said striker, said bosses being disposed with respect to each other to prevent motion of said striker in said given direction by the mutual abutment of said bosses, the end of said shaft opposite said striker urging said striker away from said resettable actuator when said shaft is in the extended position so that said second boss overrides said first boss and the force of said spring means drives said striker in said given direction an arm on said striker, further spring means engaged by said arm when said striker moves in said given direction for storing energy, so that when striker moves a given distance in said given direction to stored energy is utilized by said further spring means to move said striker in a direction opposite said given direction.

11. The combination of claim 10 further including on said striker a flexible ramplike element operatively disposed with respect to said end of said shaft so that when said striker is moved in a direction opposite said given direction said ramplike element rides over said end of said shaft and urges the latter to its retracted position for resetting said resettable actuator to its unactuated state.

References Cited by the Examiner

UNITED STATES PATENTS

| | | | |
|---|---|---|---|
| 1,298,746 | 4/1919 | Lum | 200—87 |
| 1,521,766 | 1/1925 | Harris | 200—95 |
| 2,282,933 | 5/1942 | Cahill | 200—95 |
| 2,531,838 | 11/1950 | Bergmann | 74—2 |
| 2,915,681 | 12/1959 | Troy | 317—171 |
| 2,937,250 | 5/1960 | Onksen et al. | 200—168 |
| 3,022,450 | 2/1962 | Chase | 317—171 |
| 3,037,099 | 5/1962 | Aandewiel | 200—168 |

BERNARD A. GILHEANY, *Primary Examiner.*

ROBERT K. SCHAEFER, *Examiner.*

T. A. ROBINSON, R. N. ENVALL, JR.,
*Assistant Examiners.*